United States Patent
Yang

(10) Patent No.: US 12,300,795 B2
(45) Date of Patent: May 13, 2025

(54) BATTERY COOLING CONTROL METHOD AND APPARATUS FOR ENVIRONMENTAL VEHICLE

(71) Applicants: HYUNDAI MOTOR COMPANY, Seoul (KR); KIA CORPORATION, Seoul (KR)

(72) Inventor: Bo Ram Yang, Anyang-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 588 days.

(21) Appl. No.: 17/393,775

(22) Filed: Aug. 4, 2021

(65) Prior Publication Data

US 2022/0045378 A1  Feb. 10, 2022

(30) Foreign Application Priority Data

Aug. 5, 2020 (KR) .................. 10-2020-0098162

(51) Int. Cl.
| | |
|---|---|
| H01M 10/613 | (2014.01) |
| H01M 10/625 | (2014.01) |
| H01M 10/633 | (2014.01) |
| H01M 10/6563 | (2014.01) |

(52) U.S. Cl.
CPC ....... H01M 10/613 (2015.04); H01M 10/625 (2015.04); H01M 10/633 (2015.04); H01M 10/6563 (2015.04)

(58) Field of Classification Search
CPC ............. H01M 10/613; H01M 10/625; H01M 10/633; H01M 10/6563
See application file for complete search history.

(56) References Cited

U.S. PATENT DOCUMENTS

| | | | |
|---|---|---|---|
| 6,392,372 B1* | 5/2002 | Mays, II | H02P 6/08 318/599 |
| 10,759,303 B2* | 9/2020 | Duan | G05D 1/0223 |
| 2012/0256569 A1* | 10/2012 | Kawahara | H01M 10/613 374/142 |
| 2013/0052490 A1* | 2/2013 | TenHouten | B60H 1/00278 429/50 |
| 2014/0338644 A1* | 11/2014 | MacNeille | F02D 21/08 701/115 |
| 2016/0025789 A1* | 1/2016 | Wang | G01R 31/007 324/503 |
| 2016/0276719 A1* | 9/2016 | Kikuchi | H01M 10/425 |
| 2017/0101026 A1* | 4/2017 | Lucea | B60L 58/10 |
| 2017/0240065 A1* | 8/2017 | Machida | B60L 1/003 |
| 2019/0077274 A1* | 3/2019 | Moriya | B60L 1/02 |
| 2019/0173136 A1* | 6/2019 | Seo | H01M 50/204 |
| 2020/0231023 A1* | 7/2020 | Sathasivam | H01M 10/633 |

* cited by examiner

Primary Examiner — Daniel Samwel
(74) Attorney, Agent, or Firm — Morgan, Lewis & Bockius LLP

(57) ABSTRACT

A battery cooling control method and a battery cooling control apparatus for an environmental vehicle equipped with a battery air cooling system are provided. The battery cooling control method includes collecting information for driving a cooling fan, performing data analysis based on the collected information, and performing battery cooling control based on a result of the data analysis, wherein the information includes vehicle sensor and actuator information, external environment information, and user information.

16 Claims, 6 Drawing Sheets

BATTERY COOLING CONTROL METHOD AND APPARATUS FOR ENVIRONMENTAL VEHICLE

CROSS-REFERENCE TO RELATED APPLICATION

This application claims the benefit of priority to Korean Patent Application No. 10-2020-0098162, filed on Aug. 5, 2020, the entire contents of which are incorporated herein by reference.

TECHNICAL FIELD

The present disclosure relates to battery cooling control for an environmental vehicle, and more particularly, to a technology for intelligently controlling cooling of a battery of an environmental vehicle based on big data and environmental variables in an environmental vehicle equipped with a high voltage battery and an air cooling type cooling device.

BACKGROUND

Recently, interest in eco-friendly vehicles has increased, and various eco-friendly vehicles have been developed and mass produced as environmental issues such as increased carbon dioxide and global warming have emerged. Generally, an environmental vehicle, such as an electric vehicle, a hybrid vehicle, and a plug-in hybrid vehicle, charges a battery installed in the vehicle and drives by driving a motor with power charged in the battery.

The battery of the environmental vehicle is mounted on the vehicle in the form of a battery module in which battery packs are packaged, each battery pack being formed by packaging unit battery cells.

The battery module needs to maintain an appropriate temperature range because the battery module exhibits the optimum efficiency in the appropriate temperature range.

Typically, the battery module heats up while driving, so the battery module is cooled using a coolant or a cooling fan. To control the temperature of the battery module, the coolant water is additionally heat-exchanged with a refrigerant according to the temperature of the battery module to improve cooling performance or a rotational stage of the cooling fan is controlled.

However, in the case of a conventional air cooling system using a cooling fan, cooling control of the battery module has been performed based on a map in which a driving stage of the cooling fan for each temperature of the battery and a duty value for each driving stage of the cooling fan, which are obtained through principle tests, are defined.

That is, the conventional air cooling system was operated by matching a fan stage condition for each input according to a predetermined map. There is a disadvantage in that it is hard to reflect various driving environments and apply subdivided cooling logics because only a sensor measurement value, failure information, and a cooperative control signal, which are current input values in real time, are reflected and then matching onto the map is performed.

For example, the conventional air cooling system cannot perform effective cooling according to various driving conditions such as conditions in which the outside temperature is extremely low such as the Siberia, conditions in which the outside temperature is extremely high such as the Middle East, conditions in temperate regions in which there are clear differences in temperature between the four seasons, and conditions in severe use environments, thus having a disadvantage in that the battery thermal management performance is deteriorated.

The thermal management performance is closely related to the failure or deterioration of the battery, so there is a need to improve the battery cooling control performance of an environmental vehicle equipped with an air cooling system.

SUMMARY

An aspect of the present disclosure provides an intelligent environmental vehicle battery cooling control method and apparatus.

An aspect of the present disclosure provides an intelligent environmental vehicle battery cooling control method and apparatus capable of performing fine cooling control for a battery module according to various sensing data and usage environment in an environmental vehicle equipped with an air cooling system.

An aspect of the present disclosure provides an intelligent environmental vehicle battery cooling control method and apparatus capable of improving thermal management performance by calculating cooling conditions according to data and usage environment based on real-time input values collected while driving, as well as accumulated data and analysis of usage patterns, and performing cooling control accordingly.

An aspect of the present disclosure provides an intelligent environmental vehicle battery cooling control method and apparatus capable of increasing cooling fan driving efficiency and improving fuel efficiency by performing optimal battery cooling control for each usage environment through machine learning based on big data without referring to a fixed map.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a battery cooling control method for an environmental vehicle equipped with a battery air cooling system includes collecting information for driving a cooling fan, performing data analysis based on the collected information, and performing battery cooling control based on a result of the data analysis, wherein the information includes vehicle sensor and actuator information, external environment information and user information.

In one form of the present disclosure, the battery cooling control may include at least one of a cooling fan duty control for controlling a rotational speed of the cooling fan, and an available battery power control for limiting an amount of output of a battery.

In one form of the present disclosure, the cooling fan duty control may have a resolution which is set to have a change amount in rotational speed smaller than a minimum change amount in rotational speed between driving stages of the cooling fan.

In one form of the present disclosure, the battery cooling control method may further include limiting an available battery power to a predetermined level or less when it is determined that the cooling fan has failed and a battery temperature is higher than a reference value as a result of the data analysis.

In one form of the present disclosure, the battery cooling control method may further include determining a battery cooling start temperature based on a result of the data analysis and big data accumulated in advance and starting the battery cooling control when it is determined that a battery temperature is higher than the battery cooling start temperature.

In one form of the present disclosure, the battery cooling control method may further include predicting at least one of an amount of usage of the battery and an amount of heat to be generated in the battery based on a result of the data analysis and dynamically determining a battery cooling control time point and a battery cooling control value based on at least one of the amount of usage of the battery and the amount of heat to be generated in the battery, which are predicted.

In one form of the present disclosure, the battery cooling control method may further include determining whether cooling control is necessary during parking based on a result of the data analysis and when the cooling control is necessary during the parking, performing the battery cooling control by waking up a battery management system.

In one form of the present disclosure, the information may include fan feedback frequency information indicating a rotational speed of the cooling fan, and the battery cooling control method may further include determining whether the cooling fan is normally driven based on the fan feedback frequency information and calculating an optimal duty corresponding to a target amount of cooling by tuning a duty control value of the cooling fan when the cooling fan is not normally driven.

In one form of the present disclosure, the battery cooling control method may further include predicting cooling efficiency of the battery air cooling system based on big data accumulated in advance, and performing the battery cooling control according to the predicted cooling efficiency, and the big data may include statistical information of weather/temperature/humidity by region/location/month/time zone.

In one form of the present disclosure, the vehicle sensor and actuator information may include at least one of inlet air temperature information, battery cooling start temperature information, vehicle speed information, failure information, and cooling fan status information, the external environment information may include at least one of weather information, temperature information, humidity information, location information, driving road condition information, driving road type information, and traffic condition information, and the user information may include at least one of battery usage habit information, vehicle usage habit information, departure/arrival location setting information, and cooling control accumulated information.

According to another aspect of the present disclosure, a battery cooling control apparatus for an environmental vehicle equipped with a battery air cooling system includes an input device that collects information for driving a cooling fan, a data analyzer that performs data analysis based on the collected information, and a cooling controller that performs battery cooling control based on a result of the data analysis, wherein the information includes vehicle sensor and actuator information, external environment information and user information.

In one form of the present disclosure, the battery cooling control may include at least one of a cooling fan duty control for controlling a rotational speed of the cooling fan, and an available battery power control for limiting an amount of output of a battery.

In one form of the present disclosure, the cooling fan duty control may have a resolution which is set to have a change amount in rotational speed smaller than a minimum change amount in rotational speed between driving stages of the cooling fan.

In one form of the present disclosure, the battery cooling control apparatus may further include a smart failure safety controller that limits an available battery power to a predetermined level or less when it is determined that the cooling fan has failed and a battery temperature is higher than a reference value as a result of the data analysis.

In one form of the present disclosure, the cooling controller may determine a battery cooling start temperature based on a result of the data analysis and big data accumulated in advance and start the battery cooling control when it is determined that a battery temperature is higher than the battery cooling start temperature.

In one form of the present disclosure, the cooling controller may predict at least one of an amount of usage of a battery and an amount of heat to be generated in the battery based on a result of the data analysis and dynamically determine a battery cooling control time point and a battery cooling control value based on at least one of the amount of usage of the battery and the amount of heat to be generated in the battery, which are predicted.

In one form of the present disclosure, the cooling controller may determine whether cooling control is necessary during parking based on a result of the data analysis and, when the cooling control is necessary during the parking, perform the battery cooling control by waking up a battery management system.

In one form of the present disclosure, the information may include fan feedback frequency information indicating a rotational speed of the cooling fan, and the cooling controller may determine whether the cooling fan is normally driven based on the fan feedback frequency information, and calculate an optimal duty corresponding to a target amount of cooling by tuning a duty control value of the cooling fan when the cooling fan is not normally driven.

In one form of the present disclosure, the cooling controller may predict cooling efficiency of the battery air cooling system based on big data accumulated in advance and perform the battery cooling control according to the predicted cooling efficiency, and the big data may include statistical information of weather/temperature/humidity by region/location/month/time zone.

In one form of the present disclosure, the vehicle sensor and actuator information may include at least one of inlet air temperature information, battery cooling start temperature information, vehicle speed information, failure information, and cooling fan status information, the external environment information may include at least one of weather information, temperature information, humidity information, location information, driving road condition information, driving road type information, and traffic condition information, and the user information may include at least one of battery usage habit information, vehicle usage habit information, departure/arrival location setting information, and cooling control accumulated information.

The technical problems to be solved by the present disclosure are not limited to the aforementioned problems, and any other technical problems not mentioned herein will be clearly understood from the following description by those skilled in the art to which the present disclosure pertains.

DRAWINGS

The above and other objects, features and advantages of the present disclosure will be more apparent from the following detailed description taken in conjunction with the accompanying drawings.

DETAILED DESCRIPTION

Figure 1:
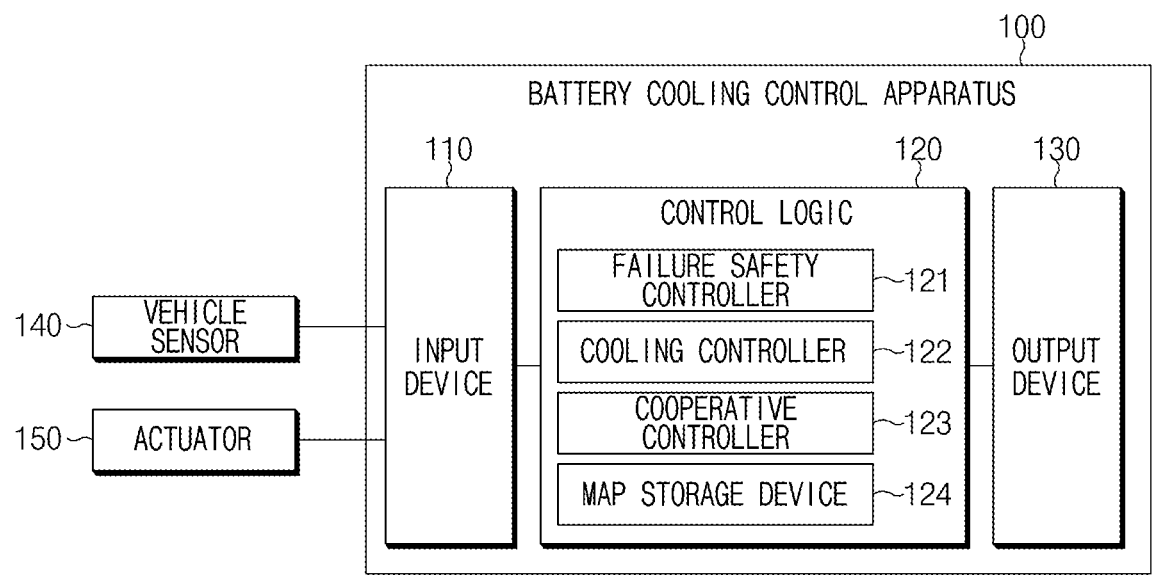
FIG. 1 is a block diagram illustrating a structure of a cooling control apparatus for an environmental vehicle battery in some forms of the present disclosure.

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing some forms of the present disclosure, a detailed description of well-known features or functions will be ruled out in order not to unnecessarily obscure the gist of the present disclosure.

In describing some forms of the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, some forms of the present disclosure will be described in detail with reference to FIGS. 1 to 6.

FIG. 1 is a block diagram illustrating a structure of a cooling control apparatus for an environmental vehicle battery in some forms of the present disclosure.

Hereinafter, for convenience of description, a cooling control apparatus 100 for an environmental vehicle battery will be described while being simply referred to as the cooling control apparatus 100.

Referring to FIG. 1, the cooling control apparatus 100 may include an input device 110, a control logic 120, and an output device 130.

The control logic 120 may include a failure safety controller 121, a cooling controller 122, a cooperative controller 123, and a map storage device 124.

The input device 110 may collect a variety of vehicle status information from sensors and actuators provided in the vehicle. Here, the vehicle status information may include vehicle speed information, failure information, cooling fan status information, and inlet air temperature information.

The failure safety controller 121 may determine whether a fan failure occurs, whether a battery is in an overheated state, or the like.

When the fan is not driven (or abnormal) and the battery is in an overheated state, the failure safety controller 121 may drive the fan at an "A" stage and limit available battery power to below a first level.

When a battery temperature cannot be identified due to the failure of a battery temperature sensor, the failure safety controller 121 may drive the fan at a "B" stage and limit the available battery power to a second level.

Here, the "B" stage may be controlled with a higher duty than that of the "A" stage to provide a faster rotational speed of the fan, and the second level may limit the available battery power to a value greater than the first level. For example, the second level may be set to 30% of the available battery power, and the first level may be set to 10% of the available battery power.

The cooling controller 122 may determine a cooling entry condition and monitor a battery temperature.

The cooling controller 122 may start cooling control when the battery temperature exceeds a cooling start temperature defined as a fixed value and the cooling entry condition is satisfied.

When cooperative control is necessary, the cooperative controller 123 may generate a predetermined cooperative control signal.

The map storage device 124 may store and maintain map information generated in advance through a principle test or the like.

For example, the map information may include a fan stage-duty mapping table in which a duty for each fan stage is predefined, and a temperature-vehicle speed cooling map in which fan stages corresponding to a battery temperature and a vehicle speed are predefined.

The input device 110 may collect a variety of input condition information for a variety of cooling control from a vehicle sensor 140 and an actuator 150.

The control logic 120 may calculate output condition information for cooling control based on the input condition information.

The output device 130 may transmit a predetermined control signal to a corresponding device (or module) according to the output condition information calculated by the control logic 120.

The input condition information may include inlet air temperature information used for battery cooling, battery module temperature measurement information for cooling start, vehicle speed information, failure information, and cooling fan information.

The inlet air temperature information may be directly measured through an inlet temperature sensor mounted on the inlet of the battery, but this is only an example, and may be estimated based on measured values of an indoor temperature sensor and(or) an outside temperature sensor provided in the vehicle.

The cooling control apparatus 100 may start cooling the battery when the battery module temperature rises and reaches a predetermined reference value.

The cooling control apparatus 100 may use vehicle speed information to estimate noise occurring during cooling control.

The failure information may include failure information of various vehicle sensors providing input condition information, actuator failure information, communication failure information, cooling fan failure information, and the like The cooling fan information may include fan feedback frequency information for monitoring a driving state of a cooling fan. The fan feedback frequency information may be used as information for determining whether the cooling fan is normally driven.

The output condition information may include available battery power limitation information, cooling fan driving stage control information, cooling fan driving duty control information, cooperative control signal, and the like.

In general, as the amount of usage of the battery increases, the battery temperature rises. When the battery temperature rises, the cooling control apparatus 100 may drive a cooling fan, limit the available power of the battery to suppress the increase in battery temperature, and perform battery cooling.

The cooling control apparatus 100 may perform cooling control by performing matching on the fan stage condition for each input with reference to a predefined map.

There is a limitation in performing efficient battery cooling control in various and complex situations because the cooling control apparatus 100 refers to input information considered to control fan driving and map information defining only a prototype situation through a principle test.

In particular, inefficient battery cooling control may shorten battery life and reduce vehicle fuel economy due to deterioration of the battery.

Accordingly, there is a disadvantage in that it is hard to efficiently control cooling of the battery module because the cooling control apparatus 100 of FIG. 1 reflects only real-time current input values (that is, vehicle sensor measurement values, failure information, cooperative control signals, or the like).

Figure 2:
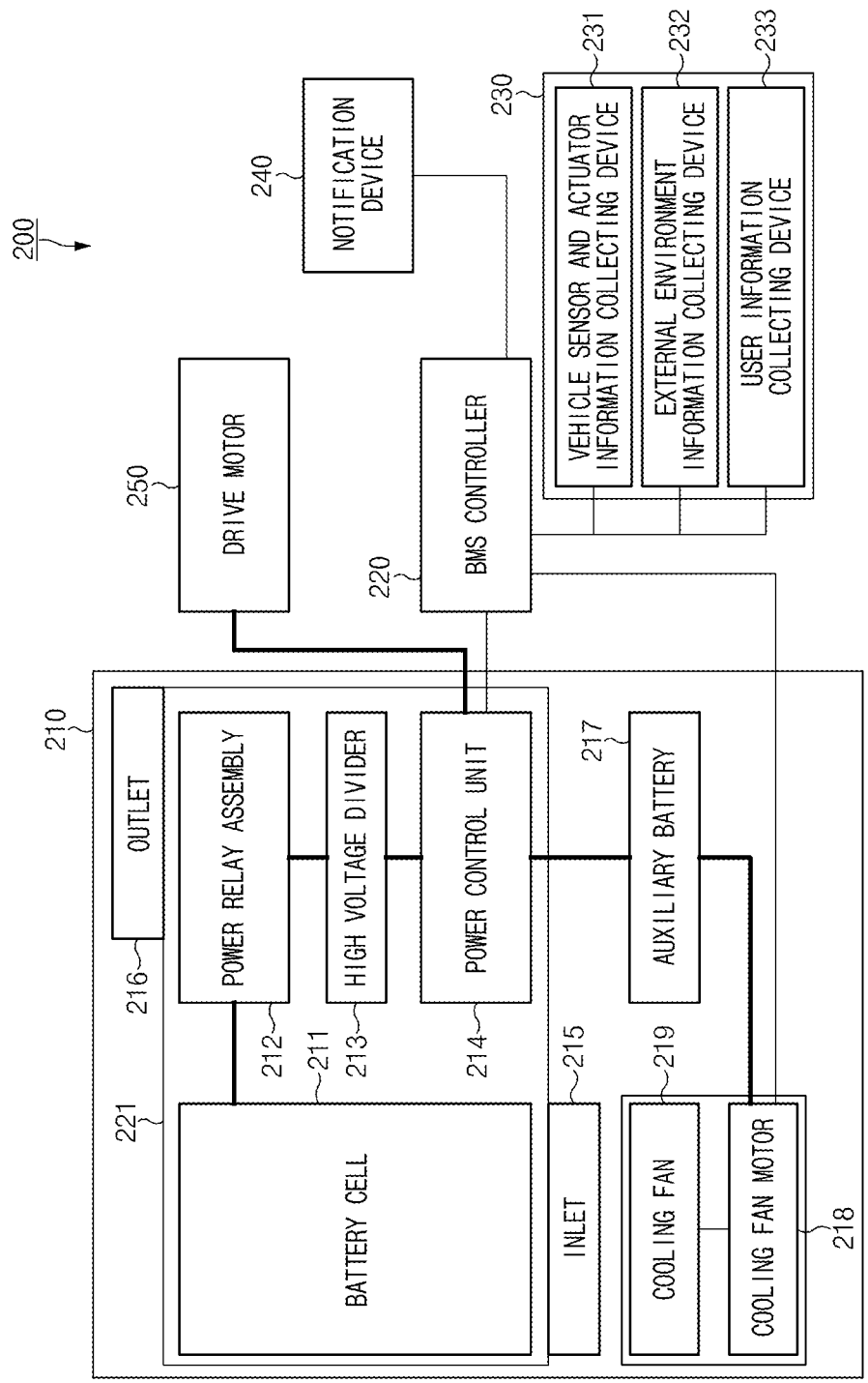
FIG. 2 is a block diagram for describing a structure of an environment vehicle in some forms of the present disclosure.

FIG. 2 is a block diagram for describing a structure of an environment vehicle in some forms of the present disclosure.

Referring to FIG. 2, an environmental vehicle 200 may be driven by including a battery air cooling system 210, a BMS controller 220, an information collecting device 230, a notification device 240, and a drive motor 250.

The battery air cooling system 210 may include a battery cell 211, a power relay assembly 212, a high voltage divider 213, an electric power control unit 214, an inlet 215, an outlet 216, an auxiliary battery 217, a cooling fan motor 218, and a cooling fan 219.

The electric power control unit 214 may be a device for integrated management of all power of an electric vehicle, and may control power supply to the drive motor 250, an air conditioner (not shown), various convenience devices and the like.

The electric power control unit 214 may include a vehicle control unit (VCU) that performs overall power control, a main control unit (MCU, not shown) that controls the drive motor 250 according to a torque command from the VCU, and an inverter (not shown), which is a power converter that converts an output of the battery cell 211 into power (high voltage DC power) required by the drive motor 250.

In addition, the electric power control unit 214 may include an LDC (not shown), which is a device that converts a high voltage from the battery cell 211 into power (low voltage DC power) required by the auxiliary battery 217.

The power relay assembly 212 may be a device that controls and manages the supply of DC power within a battery pack.

The high voltage divider 213 may be a device connected to an On Board Charger (OBC), the electric power control unit 214, the power relay assembly 212, and the like to divide a high voltage.

For convenience of description, the battery cell 211, the power relay assembly 212, the high voltage divider 213, and the electric power control unit 214 will be collectively referred to as a battery module 221.

The information collecting device 230 may include a vehicle sensor and actuator information collecting device 231, an external environment information collecting device 232, and a user information collecting device 233.

The vehicle sensor and actuator information collecting device 231 may collect a variety of vehicle information from various sensors and actuators provided in the vehicle.

Here, the vehicle information may include vehicle speed information, battery temperature information, inlet air temperature information, and failure state information of a corresponding sensor and an actuator.

The BMS controller 220 may obtain information on available battery power from the battery management system.

In addition, the BMS controller 220 may monitor information on a driving stage of the cooling fan motor 218 and a cooling fan driving duty and fan feedback frequency information.

The external environment information collecting device 232 may collect and provide current location information of the environmental vehicle 200, weather, temperature and humidity information corresponding to a current location, road state information of a current driving road, traffic state information, to the BMS controller 220, in cooperation with a GPS receiving module, a navigation system, provided in the environmental vehicle 200, an external server, and the like. Here, the road condition information may include gradient information, road type information-including, for example, highways, vehicle-only roads, general roads, backside roads, or the like-, speed limit information, section control section information, and the like.

The user information collecting device 233 may include battery usage habit information, vehicle usage habit information, departure/arrival location information, cooling control accumulation information, and the like.

The BMS controller 220 may control the operation of the battery air cooling system 210, the information collecting device 230, the notification device 240 and the drive motor 250 according to the state of the environmental vehicle 200.

When the BMS controller 220 is turned on according to the start of the environmental vehicle 200, the BMS controller 220 may control the battery management system and the cooling fan motor 218 to control the temperature of the battery module 221.

The BMS controller 220 may obtain various types of information necessary for temperature control of the battery module 221 from the information collecting device 230.

The information collecting device 230 may collect various types of information for determining whether to start cooling, a fan driving condition, or the like from various sensors, actuators, controllers, servers, or the like, provided inside and(or) outside the environmental vehicle 200.

Power required for driving the cooling fan motor 218 may be provided from the auxiliary battery 217. In some forms of the present disclosure, the auxiliary battery 217 may be charged by receiving power from the electric power control unit 214.

As an example, the auxiliary battery 217 may be charged by receiving power through the battery cell 211, the power relay assembly 212, the high voltage divider 213, and the electric power control unit 214.

The BMS controller 220 may monitor a charging state of the auxiliary battery 217 in real time through the electric power control unit 214, and dynamically transmit a predetermined control signal to the electric power control unit 214 depending on the charging state, making it possible to charge the auxiliary battery 217 through the power of the battery cell 211.

The BMS controller 220 may perform control such that the power of the battery module 221 is supplied to the drive motor 250.

When a specific event related to cooling control occurs, the BMS controller 220 may perform control such that the information on the occurrence of the event is output through the notification device 240.

The BMS controller 220 may start cooling control when a cooling entry condition or a cooling requirement condition is satisfied. The BMS controller 220 may perform cooling control that not only the battery cooling entry condition is currently satisfied, but also when it is anticipated in advance that battery cooling is necessary.

The BMS controller 220 may determine whether the battery needs to be cooled and a control value for driving the cooling fan 219 based on external environment information.

The BMS controller 220 may analyze the customer data and use environment and perform control such that cooling is started under a higher temperature condition because the low-temperature air is smoothly supplied through the inlet 215 in an area where an outside temperature is always low. On the other hand, when it is identified that the vehicle is located in an area where an outside temperature is frequently higher than 40° C. as in the Middle East, the BMS controller 220 may perform such that cooling control is started under a low temperature condition. In addition, in an area where the outside temperature is 40° C. or higher, when the vehicle is located in a place with a low outside temperature even though the cooling control is not currently and immediately required, the BMS controller 220 may perform control to reduce the battery temperature by performing cooling in advance using outside air with a low temperature.

The BMS controller 220 may determine whether the battery needs to be cooled and a control value for driving the cooling fan 219 based on the vehicle operation status and vehicle operation history data.

As an example, the BMS controller 220 may recognize a driving situation such as whether a continuous driving at a high speed is scheduled, whether a driving at a low speed is soon finished, or a driving on a slope is scheduled using vehicle location information and destination information, and estimate the amount of heat to be generated by estimating the amount of usage of the battery based on the recognized driving situation. The BMS controller 220 may perform cooling control based on the estimated change in battery temperature—that is, the amount of heat to be generated. In addition, the BMS controller 220 may perform control such that the amount of cooling is large when a long driving at high speed is expected on a highway, but perform control such that the amount of cooling is small when it is predicted that the amount of usage of the battery is small due to a low-speed driving in a situation in which the vehicle is close to the destination.

The BMS controller 220 may perform cooling control by accumulating and analyzing data obtained by collecting temperature changes when cooling is performed in an actual vehicle.

That is, the BMS controller 220 may predict the most appropriate control value according to a corresponding situation in advance, and then actually apply the control value and drive the cooling fan for monitoring, rather than perform cooling control with a fixed value based on a map.

Thereafter, the BMS controller 220 may perform cooling control while tuning the control value according to a result of the monitoring, thereby deriving an optimal control value in a corresponding situation. The optimal control value derived for each situation may be recorded and maintained in an equipped memory (not shown), and cooling control may be performed by applying the accumulated optimal control value to the next same or similar situation.

For example, when the battery temperature is B ° C. and the amount of usage of the battery is expected to be "C" under the condition of the outside temperature of A ° C., the BMS controller 220 may perform cooling control by setting a cooling fan duty to "D". When it is determined that the amount of cooling is more required in the case of cooling with the duty of "D", the BMS controller 220 may drive the cooling fan 219 by changing the duty to D+α. When it is determined that the amount of cooling is excessive in the case of cooling with the duty of "D", the BMS controller 220 may drive the cooling fan 219 by changing the duty to D−α. Here, the value "α" may be adjusted according to the situation, and when an optimal control value is found, the corresponding control value may be used for cooling control in a similar situation later.

The BMS controller 220 may determine whether the duty control is normal based on fan feedback frequency information. As a result of the determination, when the duty control is abnormal, the BMS controller 220 may derive an optimal duty value corresponding to the target amount of cooling while tuning the duty.

The BMS controller 220 may control the available power of the battery in a variable manner according to the temperature and the amount of charge of the battery at a level capable of managing battery heat and preventing deterioration based on battery cooling control information.

The BMS controller 220 may control the available power of the battery in a variable manner when it is determined that cooling of the battery is insufficient only with cooling control when considering external environment information and vehicle driving conditions. In general, as the amount of usage of the battery increases, the rate at which the battery temperature rises increases.

For example, the BMS controller 220 may determine that the battery temperature cannot be maintained within a certain range only with cooling control when a situation in which a sudden stop on a highway is detected at an outside temperature of 42° C. The BMS controller 220 may limit the available battery power by reflecting the battery temperature increase rate and the actual temperature change. Here, the available battery power limit value may be controlled from 0 to 100% in a variable manner depending on the situation, and tuning may be performed to minimize the effect of driving feeling, or the like.

The BMS controller 220 may perform cooling control in a parking mode using information on an unattended-vehicle temperature—for example, temperature information measured during parking.

When unattended-vehicle temperature is kept at a high temperature, a durability problem may occur due to deterioration of the battery even though the battery is not used.

The BMS controller 220 may periodically identify the outside temperature when an ignition is turned OFF, and wake up even while parking when the outside temperature is higher than a certain temperature to perform cooling control for a certain time.

For example, when the vehicle is left unattended for a long time in a situation where the outside temperature is 45 degrees or more, the battery temperature may rise to about the corresponding temperature. When it is determined that the temperature is high after the outside temperature is identified in a case where the vehicle is turned off, the BMS controller 220 may automatically drive to cool the vehicle. In this case, the cooling level—that is, the duty control value—may be applied by continuously tuning an optimal value and performing data accumulation based on an outside temperature and a temperature of the battery module.

The BMS controller 220 may perform cooling control in a failure situation.

When the BMS controller 220 cannot obtain input data—for example, when the BMS controller 220 cannot obtain the necessary input value due to reasons such as sensor failure, communication failure, or the like, the BMS controller 220 may perform cooling control using currently identifiable information and/or previously-accumulated big data.

For example, the BMS controller 220 may know information such as a temperature at a place mainly used by the driver of the vehicle, a temperature when driving on a highway in Seoul in winter, and a temperature when driving in a large indoor parking lot, through the previously-accumulated big data.

As an example, the BMS controller 220 may perform cooling control after predicting the temperature of the battery module using the amount of usage of the battery even though the temperature sensing value of the battery module cannot be obtained.

Figure 3:
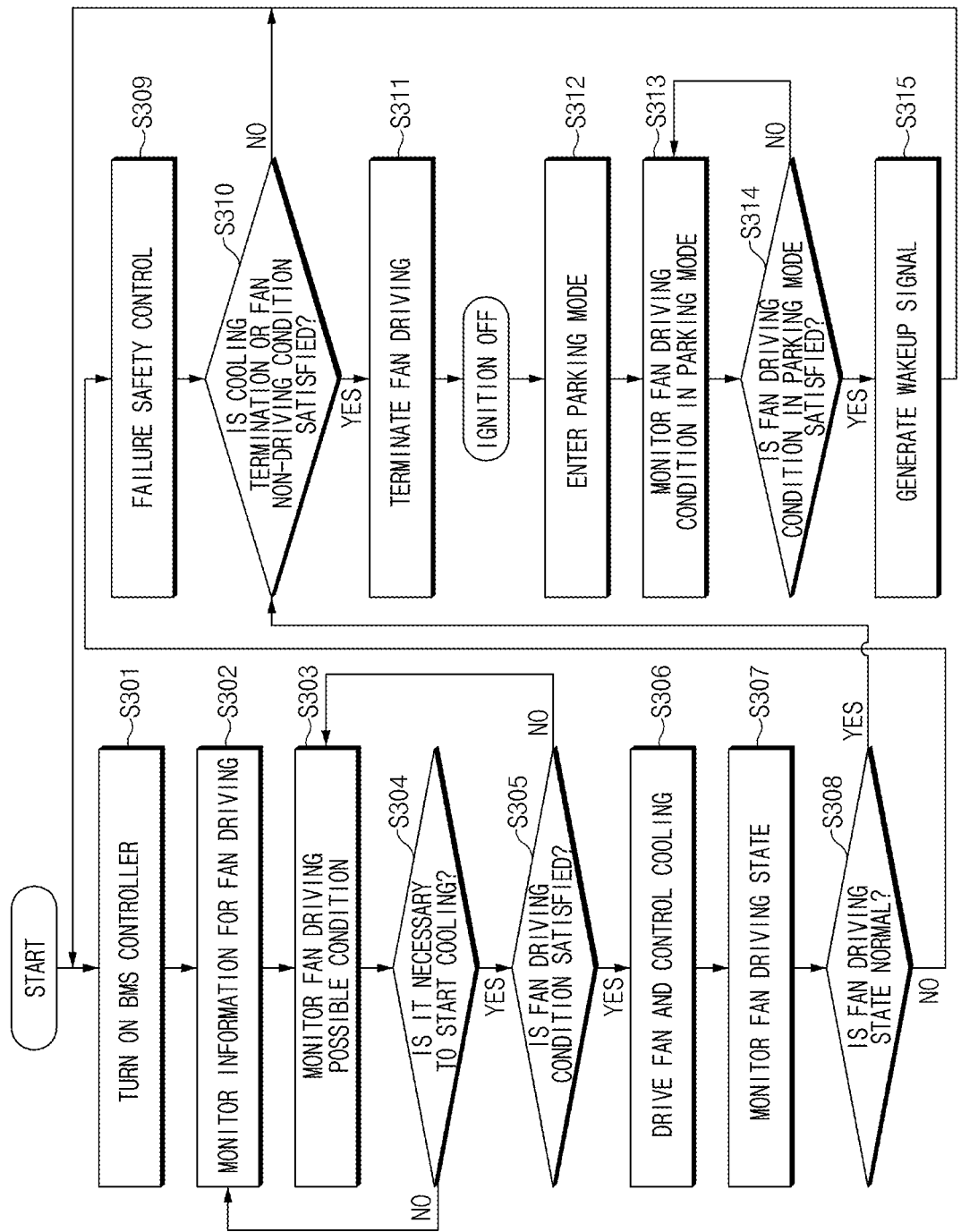
FIG. 3 is a flowchart for describing a cooling control method for an environmental vehicle battery in some forms of the present disclosure.

FIG. 3 is a flowchart for describing a cooling control method for an environmental vehicle battery in some forms of the present disclosure.

In detail, FIG. 3 is a flowchart illustrating a battery cooling control method in an environmental vehicle equipped with an air-cooling type battery cooling system.

The control method of FIG. 3 may be performed by the cooling control apparatus 100 of FIG. 1 or the environmental vehicle 200 of FIG. 2. In the following description, it will be assumed that the control method of FIG. 3 is performed by the environmental vehicle 200.

Referring to FIG. 3, when a vehicle ignition is turned on and the battery management system (BMS) controller is turned on, the environmental vehicle 200 may enter a driving mode, and monitor information required for fan driving and fan driving possible conditions (S301 to S303).

The environmental vehicle 200 may determine whether it is necessary to start cooling based on the monitored information (S304).

As a result of the determination, when it is necessary to start cooling, the environmental vehicle 200 may determine whether a fan driving possible condition is satisfied (S305).

As a result of the determination, when the fan driving possible condition is satisfied, the environmental vehicle 200 may perform cooling control by driving the fan (S306).

The environmental vehicle 200 may monitor a fan driving state during cooling control (S307).

The environmental vehicle 200 may determine whether the fan driving state is normal, based on a result of the monitoring (S308).

When the fan driving state is normal, the environmental vehicle 200 may determine whether a cooling termination condition or a fan non-driving condition is satisfied (S310).

When it is determined that the fan driving state is abnormal as a result of the determination in S308, the environmental vehicle 200 may perform a predefined failure safety control (S309). Subsequently, the environmental vehicle 200 may perform S310 described above.

As a result of the determination in step 310, when the cooling termination condition or the fan non-driving condition is satisfied, the environmental vehicle 200 may terminate the fan driving (S311). Here, the cooling termination condition or the fan non-driving condition may include IG (Ignition)-OFF, but is not limited thereto.

When the driver turns off ignition, the environmental vehicle 200 may enter a parking mode (S312).

In the parking mode, the environmental vehicle 200 may monitor a fan driving condition (S313). For example, the environmental vehicle 200 may periodically wake up in the parking mode to monitor the temperature of the battery module 221.

The environmental vehicle 200 may compare the temperature of the battery module 221 with a predetermined threshold to determine whether a fan driving condition in the parking mode is satisfied (S314).

As a result of the determination, when the fan driving condition in the parking mode is satisfied, the environmental vehicle 200 may generate a wakeup signal to drive the battery air cooling system 210 (S315).

Figure 4:
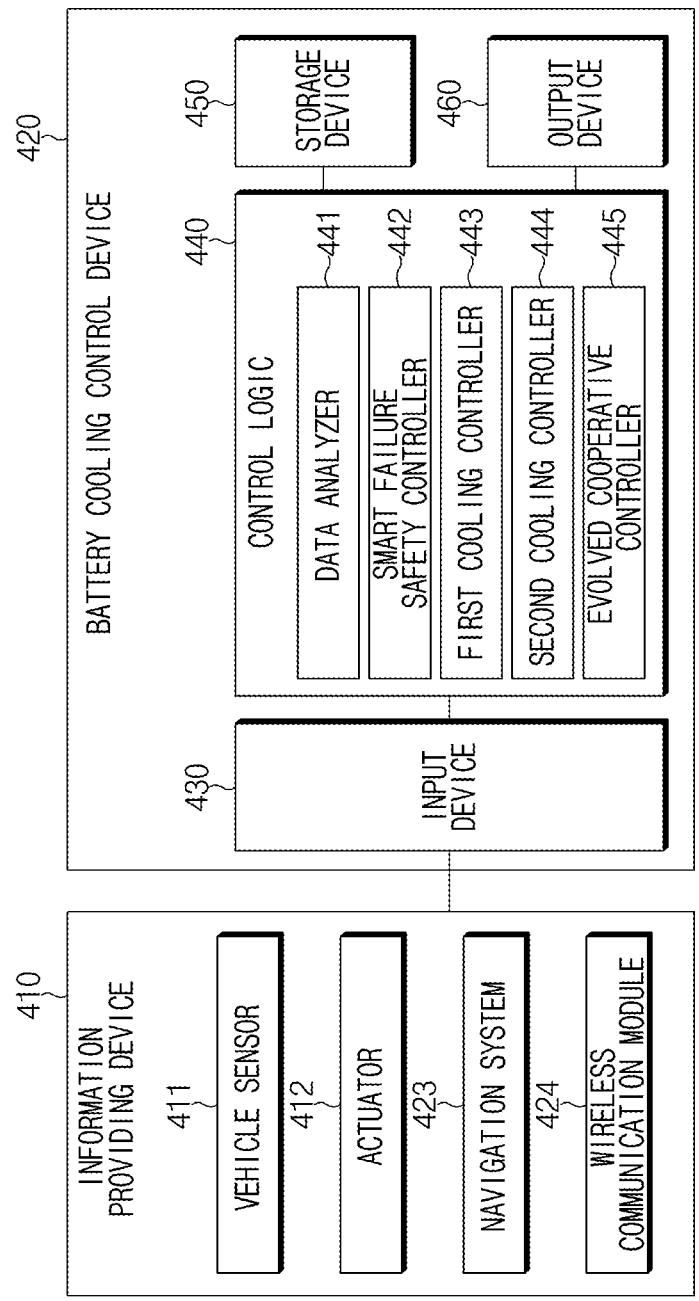
FIG. 4 is a block diagram for describing a structure of a cooling control system for an environmental vehicle battery in some forms of the present disclosure.

FIG. 4 is a block diagram for describing a structure of a cooling control system for an environmental vehicle battery in some forms of the present disclosure.

Referring to FIG. 4, an environmental vehicle battery cooling control system 400 may include an information providing device 410 and a battery cooling control apparatus 420.

Referring to FIG. 4, the information providing device 410 may include a vehicle sensor 411, an actuator 412, a navigation system 423, and a wireless communication module 424.

The battery cooling control apparatus 420 may include an input device 430, a control logic 440, a storage device 450, and an output device 460.

The input device 430 may obtain inlet air temperature information, battery cooling start temperature information, vehicle speed information, failure information, cooling fan status information, or the like provided by the vehicle sensor 411 and the actuator 412, from the information providing device 410.

In addition, the input device 430 may obtain external environment information such as current location information of the vehicle, type and state information of a current driving road from the navigation system 423, or the like.

In addition, the input device 430 may obtain external environment information such as temperature information, humidity information, and rainfall information from a sensor provided outside the vehicle.

In addition, the input device 430 may obtain external environment information such as traffic state information related to the current driving road and information related to an accident from an external server (not shown) through the wireless communication module 424 provided.

A variety of statistics and analysis information related to the user and the vehicle may be maintained in the storage device 450.

For example, the storage device 450 may store battery usage habit information, vehicle usage habit information, departure/arrival location information, cooling control accumulation information, and the like.

The control logic 440 may include a data analyzer 441, a smart failure safety controller 442, a first cooling controller 443, a second cooling controller 444, and an evolved cooperative controller 445.

The data analyzer 441 may determine whether a failure has occurred, whether cooling control is necessary during parking, or whether a cooling performance condition is satisfied during driving, whether available battery power needs to be limited, or the like by analyzing the data through machine learning based on the information collected through the input device 430 and the big data stored in the storage device 450.

The smart failure safety controller 442 may adaptively perform failure safety control according to a failure type and a failure severity detected when a failure is detected by the data analyzer 441.

For example, when a fan driving is abnormal and a high temperature of the battery is detected, the smart failure safety controller 442 may adjust a fan driving stage to a low stage and limit the available battery power to a predetermined level or less.

As another example, when it is hard to measure a temperature of the battery due to a failure of the battery temperature sensor, the smart failure safety controller 442 may adjust the fan driving stage to a middle stage or higher and limit the available battery power to a predetermined level or less.

The smart failure safety controller 442 may monitor the rotational speed of the fan corresponding to the fan driving stage. It may be possible to perform precise cooling control by comparing the rotational speed "A" of the fan measured corresponding to the currently-set fan driving stage and the rotational speed of the fan "B" required corresponding to the fan driving stage. For example, when "A" is greater than "B", the smart failure safety controller 442 may control the duty of a pulse width modulation signal input to the cooling fan motor 218 to decrease the rotational speed of the fan or decrease the available battery power by a certain level. As another example, when "A" is less than "B", the smart failure safety controller 442 may control the duty of a pulse width modulation signal input to the cooling fan motor 218 to increase the rotational speed of the fan.

When it is hard to measure a temperature of air applied to the inlet due to a malfunction of an outside air temperature measurement sensor, the smart failure safety controller 442 may request the input device 430 to connect to a specific server or telematics server on the Internet through the wireless communication module 424 to collect temperature information of an area in which the vehicle is currently driving.

The first cooling controller 443 may dynamically determine a cooling start temperature through machine learning based on the information collected through the input device 430 while driving and the big data stored in the storage device 450, change the battery cooling entry condition, and perform cooling control. The first cooling controller 443 may perform fine fan driving control according to a preset resolution in a cooling fan duty adjustable region without using a temperature-vehicle speed cooling map and a fan stage-duty map. Here, the resolution may be set to have a change amount in rotational speed smaller than the minimum change amount in rotational speed between the driving stages of the cooling fan.

In an existing map-based battery cooling control method, the difference in duty between two adjacent fan stages has a fixed value in inverse proportion to the number of adjustable fan stages in the cooling fan duty adjustable region.

However, the data and usage environment-based battery cooling control method in some forms of the present disclosure may have an advantage of performing fine fan driving control in the cooling fan duty adjustable region according to a user-set resolution.

As an example, in the existing map-based battery cooling control method, in a case where the driving stage of the cooling fan is determined to be a first stage, when the cooling fan has been driven with a predetermined fixed duty value corresponding to the first stage. On the other hand, in the data and usage environment-based battery cooling control method in some forms of the present disclosure, it may be possible to freely control the duty value for controlling the driving of the cooling fan between 0 and 100% according to situations.

The first cooling controller 443 may predict the amount of usage of the battery based on various pieces of information collected while driving, and adaptively perform cooling control based on a result of the prediction.

For example, the first cooling controller 443 may predict whether the vehicle is scheduled to continuously drive at a high speed or is going to finish driving soon at a low speed using the vehicle location information and the destination information. In addition, the first cooling controller 443 may predict whether the forward driving path is an uphill road or a downhill road based on navigation information. The first cooling controller 443 may predict the amount of heat in the battery based on a result of the prediction, and may perform cooling control based on the amount of heat. Therefore, energy consumed for cooling may be effectively reduced, thus expecting improvement in fuel efficiency.

The second cooling controller 444 may perform battery cooling control while parking.

As an example, the second cooling controller 444 may monitor the temperature of the battery module and/or the outside air temperature in a parking state after the ignition is turned OFF. The second cooling controller 444 may wake up the battery air cooling system and perform cooling control for a certain period of time when the outside air temperature and/or the temperature of the battery module measured during parking is higher than a threshold, thereby preventing battery deterioration in advance.

The first cooling controller 443 and the second cooling controller 444 may predict cooling efficiency of the battery air cooling system based on temperature/humidity statistical information by region/location/month/time zone—which may be used, for example, when a sensor has failed- and/or temperature and humidity information collected in real time, and perform cooling control according to the predicted cooling efficiency.

The first cooling controller 443 and the second cooling controller 444 may adaptively determine a cooling start temperature based on the current location information of the vehicle.

As an example, when it is determined that the outside temperature is always low as a result of analysis of data and use environment—for example, the Siberian region, the first cooling controller 443 and the second cooling controller 444 may perform control such that cooling is started under high temperature conditions because low-temperature air may be supplied to the inlet. On the other hand, as in the Middle East, when the outside temperature in the middle of the day is at a high temperature of 40 degrees or more, the first cooling controller 443 and the second cooling controller 444 may perform control such that cooling is started under low temperature conditions because high temperature air is always supplied to the inlet.

The first cooling controller 443 may perform cooling control in consideration of a previous driving speed and an expected driving speed in addition to the vehicle speed measured in real time. As an example, the first cooling controller 443 may perform cooling control by increasing the stage of the cooling fan when a continuous high-speed driving is expected, and by decreasing the stage of the cooling fan when a low-speed or stopping is expected.

The first cooling controller 443 may perform cooling control based on cooling fan information.

Here, the cooling fan information may include fan feedback frequency information for monitoring a driving state of the cooling fan.

The first cooling controller 443 may monitor cooling effects according to conditions for each fan driving frequency and may accumulate the results of monitoring as big data.

The first cooling controller 443 may predict a change of the temperature of the battery module and dynamically determine a controllable condition to perform cooling control when the cooling fan rotates at a rotational speed lower or higher than a cooling fan driving command.

For example, in a situation in which the cooling fan is required to be driven at 80% of the duty value for controlling the driving of the cooling fan but the cooling fan is continuously driven at 40% of the duty value due to the failure of the cooling fan, and the first cooling controller 443 may decrease the cooling start temperature or limit the available battery power in consideration of the above situation. The first cooling controller 443 may decrease or limit the cooling start temperature and the available battery power in a stepwise manner according to the battery cooling control state.

The first cooling controller 443 may adaptively change the available power of the battery according to the temperature and the state of charge of the battery at a level capable of managing battery heat and preventing battery deterioration based on the battery cooling control information.

For example, when a high outside temperature and a current driving speed are expected to be kept, the first cooling controller 443 may limit the available power of the battery in a stepwise manner.

The evolved cooperative controller 445 may determine whether a cooperative control request is necessary based on a result of analysis of a variety of information acquired through the input device 430 and output a cooperative control signal to a peripheral device according to a result of the determination.

The output device 460 may output various control values (for example, a duty control value, or an available battery power limit value), a notification message, a cooperative control signal or the like, to a corresponding device.

As an example, the control logic 440 of the battery cooling control apparatus 420 of FIG. 4 may be mounted in the BMS controller 220 of FIG. 2.

Figure 5:
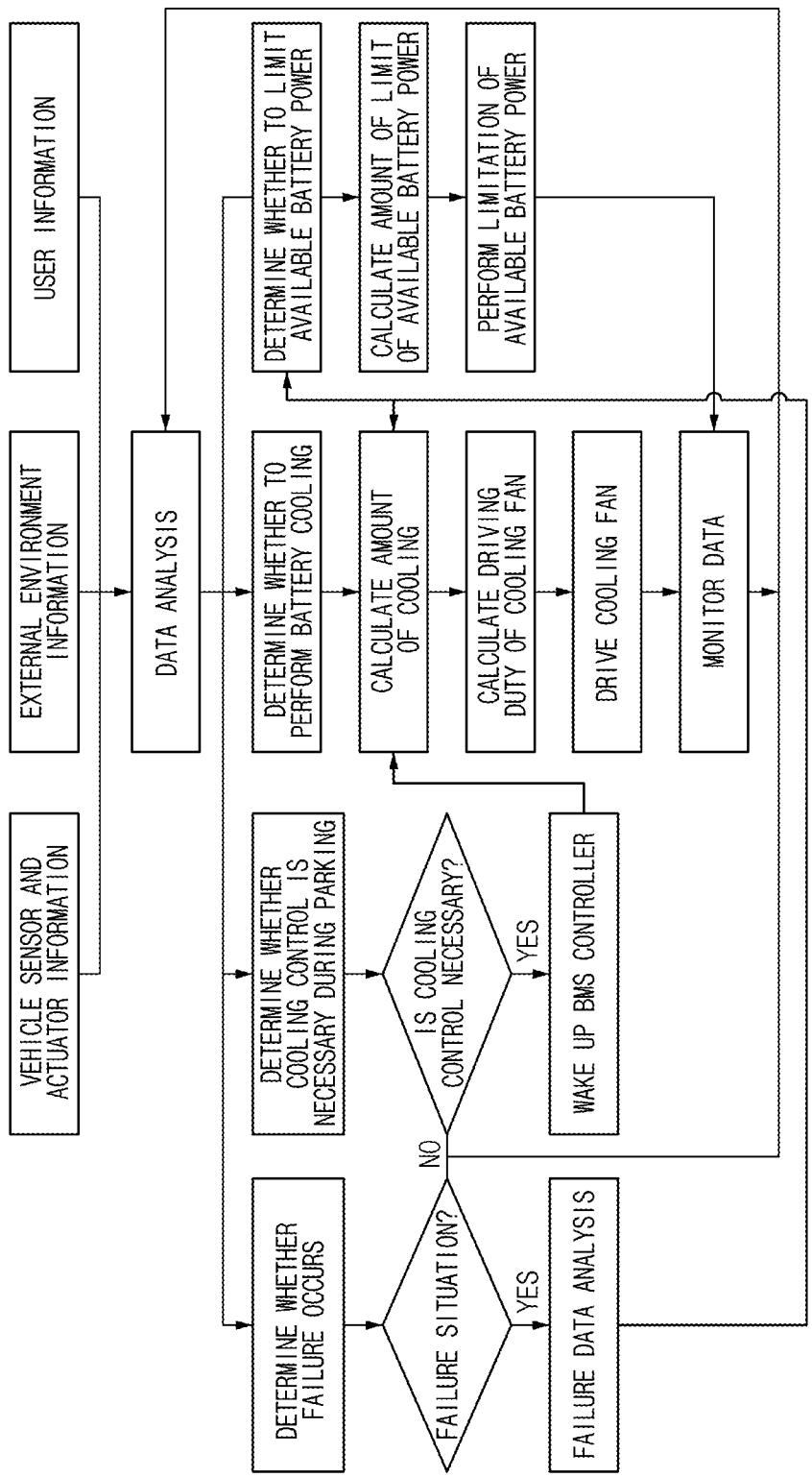
FIG. 5 is a flowchart for describing a battery cooling control process for an environmental vehicle in some forms of the present disclosure.
Figure 6:
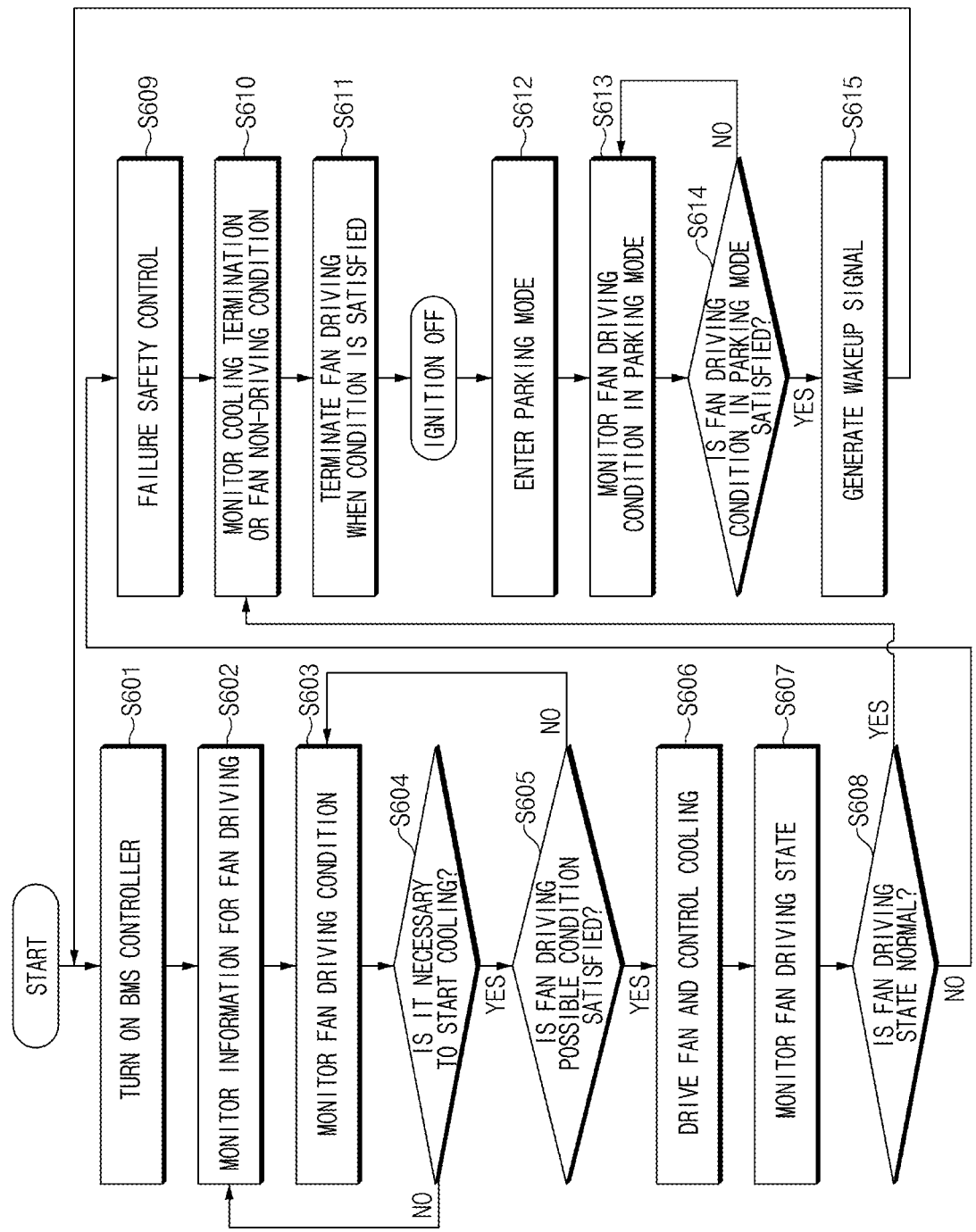
FIG. 6 is a flowchart for describing a cooling control method for an environmental vehicle battery in some forms of the present disclosure.

FIG. 5 is a flowchart for describing a battery cooling control process for an environmental vehicle in some forms of the present disclosure.

Referring to FIG. 5, the environmental vehicle may collect vehicle sensor and actuator information, external environment information, user information, and the like, and perform data analysis on the collected information.

Through the data analysis, the environmental vehicle may determine whether there is a failure, whether cooling is necessary during parking, whether to perform battery cooling, and whether to limit an available battery power.

When a failure has occurred as a result of the data analysis, the environmental vehicle may perform cooling control and/or control of the available battery power by analyzing failure data.

When it is determined that cooling control is necessary during parking as a result of the data analysis, the environmental vehicle may wake up the BMS controller and calculate a required amount of cooling to perform cooling control.

When the cooling control for the battery is necessary while driving as a result of the data analysis, the environmental vehicle may calculate a driving duty of the cooling fan by calculating a required amount of cooling, and drive the cooling fan according to the calculated duty. In this case, the environmental vehicle may monitor a driving state of the cooling fan and perform an operation of tuning a control value according to a result of the monitoring.

When it is determined that it is necessary to limit the available power of the battery as a result of the data analysis, the environmental vehicle may perform an operation of limiting the available power of the battery by calculating the limit of the available power of the battery.

When an ignition is turned on, the environmental vehicle may turn on a BMS controller to monitor information for fan driving and fan driving possible conditions (S601 to S603). Here, the monitored information may include vehicle sensor and actuator information, external environment information, user information, and the like.

The environmental vehicle may determine whether it is necessary to start cooling based on the monitored information (S604).

When it is necessary to start cooling, the environmental vehicle may determine whether a fan driving condition is satisfied (S605).

As a result of the determination, when a fan driving possible condition is satisfied, the environmental vehicle may perform fan driving and perform cooling control (S606).

The environmental vehicle may monitor a fan driving state during the cooling control and determine whether the fan driving state is normal (S607 to S608).

The environmental vehicle may perform failure safety control when the fan driving state is abnormal (S609).

The environmental vehicle may monitor a cooling termination condition or a fan non-driving condition, and may terminate the fan driving when the condition is satisfied (S610 and S611).

The environmental vehicle may enter a parking mode when the ignition is turned off and monitor the fan driving condition (S612 and S613).

The environmental vehicle may determine whether a parking mode fan driving condition is satisfied (S614). As an example, the environmental vehicle may determine that the parking mode fan driving condition is satisfied when the outside temperature higher than or equal to a predetermined threshold is kept for a predetermined time during parking.

As another example, when the temperature of a battery module is higher than a reference value after entering the parking mode, the environmental vehicle may determine that the parking mode fan driving condition is satisfied. As another example, the environmental vehicle may determine whether or not the parking mode fan driving condition is satisfied by considering both the outside temperature and the battery module temperature.

The environmental vehicle may generate a wakeup signal to turn on the BMS controller when the parking mode fan driving condition is satisfied (S615).

The operations of the method or the algorithm described in some forms of the present disclosure may be embodied directly in hardware or a software module executed by the processor, or in a combination thereof. The software module may reside on a storage medium (that is, the memory and/or the storage) such as a RAM, a flash memory, a ROM, an EPROM, an EEPROM, a register, a hard disk, a removable disk, and a CD-ROM.

The exemplary storage medium may be coupled to the processor, and the processor may read information out of the storage medium and may record information in the storage medium. Alternatively, the storage medium may be integrated with the processor. The processor and the storage medium may reside in an application specific integrated circuit (ASIC). The ASIC may reside within a user terminal. In another case, the processor and the storage medium may reside in the user terminal as separate components.

The above description is merely illustrative of the technical idea of the present disclosure, and various modifications and variations may be made without departing from the essential characteristics of the present disclosure by those skilled in the art to which the present disclosure pertains. Accordingly, some forms of the present disclosure is not intended to limit the technical idea of the present disclosure but to describe the present disclosure, and the scope of the technical idea of the present disclosure is not limited by the forms of the present disclosure. The scope of protection of the present disclosure should be interpreted by the following claims, and all technical ideas within the scope equivalent thereto should be construed as being included in the scope of the present disclosure.

According to the present disclosure, it is possible to provide an intelligent environmental vehicle battery cooling control method and apparatus.

Further, the present disclosure provides an intelligent environmental vehicle battery cooling control method and apparatus capable of performing fine cooling control for a battery module according to various sensing data and a use environment in an environmental vehicle equipped with an air cooling system.

The present disclosure provides provide an intelligent environmental vehicle battery cooling control method and apparatus capable of improving thermal management performance by calculating cooling conditions according to data and usage environment based on real-time input values collected while driving, as well as accumulated data and analysis of usage patterns, and performing cooling control accordingly.

The present disclosure provides an intelligent environmental vehicle battery cooling control method and apparatus capable of increasing cooling fan driving efficiency and improving fuel efficiency by performing optimal battery cooling control for each usage environment through machine learning based on big data without using a fixed map for battery cooling control.

In addition, various effects may be provided that are directly or indirectly understood through the disclosure.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A battery cooling control method for an environmental vehicle equipped with a battery air cooling system, the battery cooling control method comprising:
    collecting information for driving a cooling fan;
    performing data analysis based on the collected information;
    performing battery cooling control based on a result of the data analysis;
    determining a battery cooling start temperature based on the result of the data analysis and big data accumulated in advance;
    starting the battery cooling control by driving the cooling fan when it is determined that a battery temperature is higher than the battery cooling start temperature; and
    when it is determined that the cooling fan has failed and the battery temperature is higher than a reference value as the result of the data analysis, limiting an available battery power to at least a predetermined level,
    wherein the information includes vehicle sensor and actuator information, external environment information, and user information, and
    wherein the user information includes battery usage habit information, vehicle usage habit information, departure/arrival location information, and cooling control accumulation information.

2. The battery cooling control method of claim 1, wherein the performing the battery cooling control comprises:
    performing at least one of a cooling fan duty control for controlling a rotational speed of the cooling fan, or an available battery power control for limiting an amount of output of a battery.

3. The battery cooling control method of claim 2, wherein the performing the cooling fan duty control comprises:
    performing the cooling fan duty control that has a resolution set to have a change amount in the rotational speed less than a minimum change amount in the rotational speed between driving stages of the cooling fan.

4. The battery cooling control method of claim 1, further comprising:
    predicting at least one of an amount of usage of a battery or an amount of heat to be generated in the battery based on the result of the data analysis; and
    dynamically determining a battery cooling control time point and a battery cooling control value based on at least one of the amount of usage of the battery or the amount of heat to be generated in the battery.

5. The battery cooling control method of claim 1, further comprising:
    determining whether cooling control is necessary during parking based on the result of the data analysis; and
    when it is determined that the cooling control is necessary during the parking, performing the battery cooling control by waking up a battery management system.

6. The battery cooling control method of claim 1, further comprising:
    determining whether the cooling fan is normally driven based on fan feedback frequency information; and
    when it is determined that the cooling fan is not normally driven, calculating an optimal duty corresponding to a target amount of cooling by tuning a duty control value of the cooling fan,
    wherein the information further includes the fan feedback frequency information indicating a rotational speed of the cooling fan.

7. The battery cooling control method of claim 1, further comprising:
    predicting cooling efficiency of the battery air cooling system based on the big data accumulated in advance; and
    performing the battery cooling control according to the predicted cooling efficiency, wherein the big data includes statistical information of weather, temperature, humidity by region, location, month, and time zone.

8. The battery cooling control method of claim 1, wherein:
the vehicle sensor and actuator information includes at least one of inlet air temperature information, battery cooling start temperature information, vehicle speed information, failure information, or cooling fan status information, and
the external environment information includes at least one of weather information, temperature information, humidity information, location information, driving road condition information, driving road type information, or traffic condition information.

9. A battery cooling control apparatus for an environmental vehicle equipped with a battery air cooling system, the battery cooling control apparatus comprising:
a memory storing program instructions; and
a processor configured to execute the program instructions, the program instructions when executed configured to:
perform data analysis based on collected information;
perform battery cooling control based on a result of the data analysis;
determine a battery cooling start temperature based on the result of the data analysis and big data accumulated in advance;
start the battery cooling control by driving a cooling fan when it is determined that a battery temperature is higher than the battery cooling start temperature; and
limit an available battery power to at least a predetermined level when it is determined that the cooling fan has failed and the battery temperature is higher than a reference value as the result of the data analysis,
wherein the collected information includes vehicle sensor and actuator information, external environment information, and user information, and
wherein the user information includes battery usage habit information, vehicle usage habit information, departure/arrival location information, and cooling control accumulation information.

10. The battery cooling control apparatus of claim 9, wherein the processor is further configured to:
perform at least one of a cooling fan duty control for controlling a rotational speed of the cooling fan, or an available battery power control for limiting an amount of output of a battery.

11. The battery cooling control apparatus of claim 10, wherein the processor is configured to:
perform the cooling fan duty control that has a resolution set to have a change amount in the rotational speed less than a minimum change amount in the rotational speed between driving stages of the cooling fan.

12. The battery cooling control apparatus of claim 9, wherein the processor is configured to:
predict at least one of an amount of usage of the battery or an amount of heat to be generated in the battery based on the result of the data analysis; and
dynamically determine a battery cooling control time point and a battery cooling control value based on at least one of the amount of usage of the battery or the amount of heat to be generated in the battery.

13. The battery cooling control apparatus of claim 9, wherein the processor is configured to:
determine whether cooling control is necessary during parking based on the result of the data analysis; and
perform the battery cooling control by waking up a battery management system when it is determined that the cooling control is necessary during the parking.

14. The battery cooling control apparatus of claim 9, wherein the processor is configured to:
determine whether the cooling fan is normally driven based on fan feedback frequency information; and
calculate an optimal duty corresponding to a target amount of cooling by tuning a duty control value of the cooling fan when it is determined that the cooling fan is not normally driven,
wherein the information further includes the fan feedback frequency information indicating a rotational speed of the cooling fan.

15. The battery cooling control apparatus of claim 9, wherein the processor is configured to:
predict cooling efficiency of the battery air cooling system based on the big data accumulated in advance; and
perform the battery cooling control according to the predicted cooling efficiency,
wherein the big data includes statistical information of weather, temperature, humidity by region, location, month, and time zone.

16. The battery cooling control apparatus of claim 9, wherein:
the vehicle sensor and actuator information includes at least one of inlet air temperature information, battery cooling start temperature information, vehicle speed information, failure information, or cooling fan status information, and
the external environment information includes at least one of weather information, temperature information, humidity information, location information, driving road condition information, driving road type information, or traffic condition information.

* * * * *